(No Model.)
J. R. FINNEY.
ELECTRIC MALLET.
No. 270,187. Patented Jan. 2, 1883.
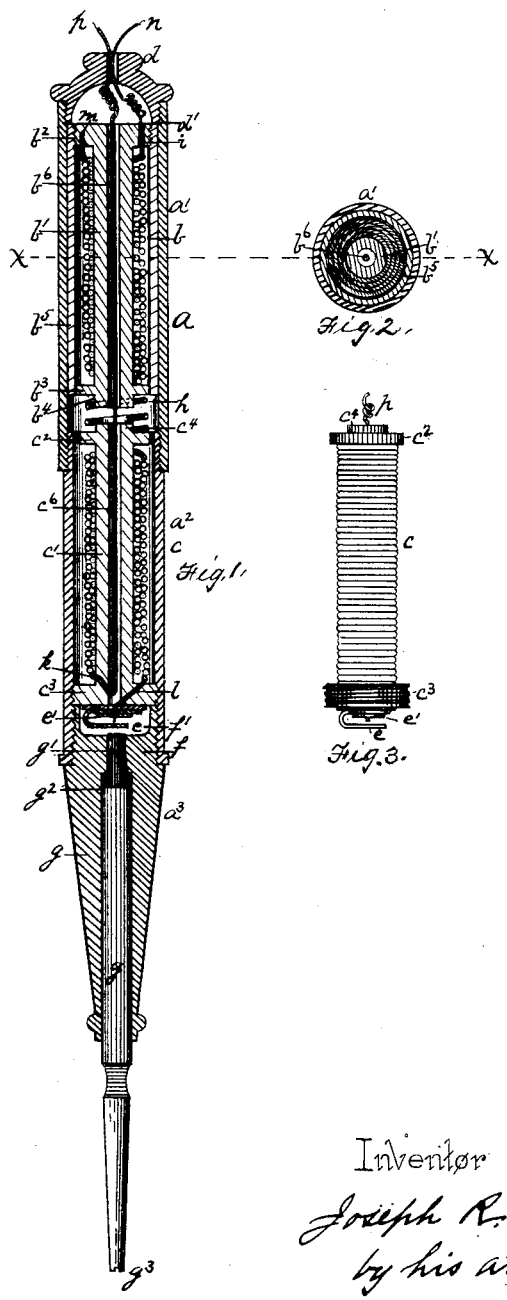
Witnesses
R. C. Wrenshall
H. B. Corwin
Inventor
Joseph R. Finney
by his attys
Bakewell & Kerr

UNITED STATES PATENT OFFICE.

JOSEPH R. FINNEY, OF PITTSBURG, ASSIGNOR TO HIMSELF AND THOMAS B. KERR, OF ALLEGHENY CITY, PENNSYLVANIA.

ELECTRIC MALLET.

SPECIFICATION forming part of Letters Patent No. 270,187, dated January 2, 1883.

Application filed June 5, 1882. (No model.)

*To all whom it may concern:*

Be it known that I, JOSEPH R. FINNEY, of Pittsburg, in the county of Allegheny and State of Pennsylvania, have invented a new and useful Improvement in Electric Mallets; and I do hereby declare the following to be a full, clear, and exact description thereof, reference being had to the accompanying drawings, forming a part of this specification, in which—

Figure 1 is a longitudinal section of my improved electric mallet. Fig. 2 is a cross-section on the line $x\,x$, Fig. 1; and Fig. 3 is a side view of one of the mallets.

Like letters of reference indicate like parts in each.

The case $a$ is for convenience and cheapness composed of three short tubular sections, $a'$, $a^2$, and $a^3$, which are united by screw-threads. In the section $a'$ is an electro-magnet, $b$, having an iron core, $b'$, flanges $b^2\,b^3$, a knocking-head, $b^4$, and a casing, $b^5$. One of the circuit-wires, $n$, is wrapped in any desired number of coils around the core $b'$. The diameter of the casing $b^5$ is of a proper size to be in contact with the sides of the section $a'$ and yet to slide freely therein. The magnet $b$ is shorter than the section $a'$, in order to permit it to have any desired length of stroke therein, the length of the stroke being regulated by a screw-cap, $d$, which closes the outer end of the section $a'$, and has a shoulder, $d'$, projecting into the interior of the bore of the section to act as a stop to gage the axial movement of the magnet $b$. The section $a^2$ contains a stationary electro-magnet, $c$, having an iron core, $c'$, flanges $c^2\,c^3$, and an anvil-head, $c^4$. The other circuit-wire, $p$, is wrapped in any desired number of coils around the core $c'$. The magnet $c$ is secured in the section $a^2$ by threading the periphery of the flange $c^3$ and screwing it into one end of the section. The section $a^3$ has a screw-plug, $f$, which, when screwed into the end of the section $a^2$, bears against the flange $c^3$, and thereby holds the magnet $c$ firmly in place. The mallet $g$ has a stem, $g'$, of smaller diameter at its rear end, and a shoulder, $g^2$, between the main body and the stem. It fits loosely in the bore of the section $a^3$, which is of corresponding shape, and the end of the stem $g'$ projects into a recess, $f'$, formed in the end of the plug $f$. Between the contiguous ends of the electro-magnets $b$ and $c$ is a spiral or other suitable spring, $h$, the coils of which encircle the knocking-head $b^4$ and the anvil $c^4$. Extending axially through the cores $b'\,c'$, respectively, are holes $b^6\,c^6$. Through the flange $b^2$ is a hole, $i$. On the outer end of the magnet $c$ is a U-shaped spring, $e$, one end of which is fastened to the flange $c^3$, and the other stands free in the recess $f'$ and extends between the end of the mallet-stem $g'$ and the center of the flange $c^3$.

The circuit is made as follows: The wires used are covered with silk or other insulating material, and are both led through the hole $d^2$ in the cap $d$. One wire, $p$, passes through bores $b^6\,c^6$ of the magnets. It then extends through a hole, $k$, in the core $c'$, and is wrapped around the core in any desired number of coils. It then is passed through a hole, $l$, in the core $c'$, and is fastened in a lead or other suitable washer, $e'$, on the flange $c^3$, with its end projecting therefrom close to but not in contact with the free end of the spring $e$. The other wire, $n$, extends through the hole $i$ around the core $b'$, and thence back, and is fastened in the casing $b^5$ at $m$. The casing $b^5$ is in electrical connection with the metallic case $a$, which is in electrical connection with the mallet $g$. If the end $g^3$ of the mallet is pressed slightly against an object—say a tooth or filling in the use of a dental mallet—the stem $g'$ comes in contact with the spring $e$ and forces it against the projecting end of the wire $p$ and completes the circuit, the cores of the magnets are instantly magnetized, and the movable magnet $b$ is attracted to the stationary magnet $c$ with sufficient power to overcome the spring $h$ and to cause the head $b^4$ to deliver a sudden blow upon the anvil $c^4$. The jar upon the whole instrument thus given is concentrated at and delivered by the point $g^3$ of the mallet upon the tooth. The slackening of the pressure of the hand upon the mallet enables the spring $e$ to leave the point of the wire $p$, opens the circuit, and demagnetizes the cores $b'\,c'$. The spring $h$ then recoils and throws back the movable magnet $b$. Thus by pressing the mallet lightly in place on the filling a blow is obtained, and by withdrawing the pressure the circuit is broken and the magnets put in position for another blow.

I have shown in Fig. 1 only two coils of the wires around the cores; but this is merely for clearness of illustration. The magnet $b$ has its casing $b^5$ connected with the flange $b^2$, but not with the flange $b^3$. This casing $b^5$, being from its nature an extension of the core $b'$, brings the poles of the magnet together or into the same plane, and the arrangement shown enables me to obtain the power of two separate electro-magnets with a saving of bulk, material, and cost. The chief value consists, however, in the great power obtained within the restricted limits of the case $a'$.

I have shown the invention as applied to a dental mallet; but I do not limit myself to this application, as it is also useful in the construction of rock-drills for small forging, driving nails, and for other purposes, in which case the end of the mallet $g$ is fitted for the attachment of properly-shaped bits or tools, or, in other words, is a sliding tool holder.

A screw or other form of gage may be used instead of the shoulder $d'$ on the cap $d$, if desired. If desired, both of the magnets may be provided with the external casing, $b^5$, in which cases the polar ends would be contiguous; also, if desired, the arrangement of the wires may be reversed, the positive wire going around the magnet $b$ and the negative around the magnet $c$. An external casing may be made of rubber, wood, or other material, if desired.

I am aware of the prior use of electro-magnets as armatures, and do not broadly claim the same; but

What I claim as my invention, and desire to secure by Letters Patent, is—

1. The combination, in an electric mallet or similar tool, of a stationary electro-magnet with a loose electro-magnet having an axial movement, the adjacent ends of said magnets having knocking-heads which are contiguous to each other, substantially as and for the purposes described.

2. The combination, in an electric mallet or similar tool, of a stationary electro-magnet, a loose electro-magnet having an axial movement, said magnets being provided with contiguous knocking-heads, and an interposed spring, substantially as and for the purposes described.

3. The combination, in an electric mallet or similar tool, of a movable electro-magnet, a stationary magnet, the coils of which are connected to the opposite poles of the battery, and which have knocking-heads on their contiguous ends, an interposed spring, a mallet capable of an axial movement, and a circuit-breaker, substantially as and for the purposes described.

4. The combination, in an electric mallet or similar tool, of a movable electro-magnet for giving the stroke, with an adjustable stop for determining the length of the stroke, substantially as and for the purposes described.

5. The combination, in an electric mallet or similar tool, of a spring-contact by which the circuit is made or broken with an axially-moving tool-holder for actuating the spring, substantially as and for the purposes described.

6. The combination, in an electric mallet or similar tool, of a loose electro-magnet having an axial movement, and which delivers a blow upon a suitable knocking-head when the circuit is made, with a spring which restores it to its normal position when the circuit is broken, substantially as and for the purpose described.

7. The combination, in an electric mallet or similar tool, of a movable electro-magnet, which delivers a blow upon a suitable knocking-head when the circuit is made, a circuit-breaker, and a spring for restoring the magnet to its normal position when the circuit is broken, substantially as and for the purposes described.

8. The combination, in an electric mallet or similar tool, of an electro-magnet having its opposite poles brought to the same radial plane, and provided with a knocking-head, in combination with an opposed electro-magnet, also having a knocking-head, substantially as and for the purposes described.

9. The combination, in an electric mallet or similar tool, of two electro-magnets, one of which has an axial movement and both of which have hollow cores, through which one of the circuit-wires is extended, substantially as and for the purposes described.

10. The combination, in an electric mallet or similar tool, of an electro-magnet formed of a core wrapped with one of the circuit-wires in electrical contact with the case or other conductor, with a second electro-magnet formed of a core wrapped with the other circuit-wire, and a movable tool in contact with the case, by which the circuit is completed, substantially as and for the purposes described.

11. The combination, in an electric mallet or similar tool, of an elastic metal circuit-breaker with a movable stem or tool electrically connected with one of the circuit-wires, by which the elastic circuit-breaker is forced into electrical contact with the other circuit wire or conductor, substantially as and for the purposes described.

In testimony whereof I have hereunto set my hand this 31st day of May, A. D. 1882.

JOSEPH R. FINNEY.

Witnesses:
T. B. KERR,
JAMES H. PORTE.